Dec. 13, 1960　　J. DE MONTREMY　　2,963,942
BINOCULAR TELESCOPES

Filed Jan. 8, 1958　　2 Sheets-Sheet 1

Dec. 13, 1960   J. DE MONTREMY   2,963,942
BINOCULAR TELESCOPES
Filed Jan. 8, 1958   2 Sheets-Sheet 2

United States Patent Office 2,963,942
Patented Dec. 13, 1960

2,963,942
BINOCULAR TELESCOPES

Jean De Montremy, 8 Ave. des Tilleuls, Paris, France

Filed Jan. 8, 1958, Ser. No. 707,831

Claims priority, application France Jan. 9, 1957

1 Claim. (Cl. 88—34)

The present invention relates to binocular telescopes and more particularly to periscopic binocular telescopes, that is to say binocular telescopes enabling the observer to see over or around an obstacle.

It is known that an optical instrument has an "exit pupil" (generally the image of the objective of this instrument formed by the eyepiece thereof) where the pupil of the observer's eye is to be placed to obtain the best possible conditions of vision. As a rule, this exit pupil is located at a very short distance behind the eye lens so that the observer's eye must be guided with respect thereto by means of an eyepiece shade.

In some optical instruments, such as sighting telescopes, the exit pupil is located at a greater distance behind the eye lens. But, in addition to the fact that this distance is still relatively small, such constructions are not applicable to binocular instruments because it is necessary to have the observer's eyes placed exactly on the respective optical axes of the two elementary telescopes which form the instrument, i.e. to be able to adjust the distance between said axes in accordance with the distance between the eyes of every observer so that construction of such instruments would be delicate and adjustment and focussing thereof very difficult in view of the fact that the observer's eyes are not guided with respect to the instrument.

In order to obviate this drawback, according to my invention, in a binocular instrument of the above mentioned type including a diverging lens placed between the objective and the eyepiece so that the exit pupil is at a substantial distance behind the eye lens, I give the lenses of said instrument diameters ranging from 4 to 6 centimeters so that their exit pupil has a diameter ranging from 3 to 5 centimeters, the above mentioned elements being so disposed that said exit pupil is located at a distance behind the eyepiece ranging from 15 to 30 centimeters, the distance between the two elementary telescopes being fixed at a value equal to the average distance between the eyes of normal persons, whereby any observer can place the pupils of his eyes respectively in the exit pupils of the telescope without adjustment thereof.

A preferred embodiment of my invention will be hereinafter described with reference to the accompanying drawings, given merely by way of example and in which:

Fig. 1 diagrammatically illustrates the optical elements of an instrument made according to my invention.

Figure 1:
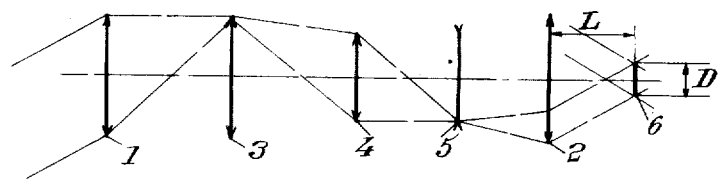

Fig. 1 diagrammatically shows at 1 the objective of a telescope made according to my invention, at 2 its eyepiece, at 3 a field lens, at 4 an erector and at 5 a diverging lens intended to place the exit pupil at a substantial distance behind the eye lens.

The objective 1 gives a real inverted image of the object which is formed in lens 3. The erector 4 inverses this image and conveys it to the diverging lens 5. The eye lens 2 forms at infinity the image seen from this lens 5.

On the other hand, the mount of the objective 1 plays, as in all telescopes, the part of entrance pupil of the instrument. The field lens 3 forms the image of this entrance pupil in the plane of the erector 4 and the diverging lens 5 optically transfers this image to such a distance from eye lens 2 that the image given by said eye lens, and which is the exit pupil, is formed at a distance averaging for instance from 15 to 30 centimeters from eye lens 2, with a diameter ranging from 3 to 5 centimeters.

Figure 2:
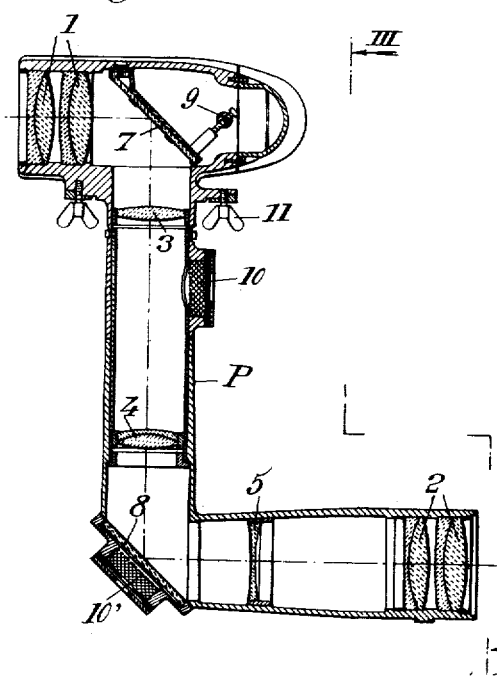
Figs. 2 and 3 are, respectively, an axial section on the line II—II of Fig. 3 and an end view in the direction of arrows III—III of Fig. 2 of a binocular periscopic telescope made according to my invention.
Figure 3:
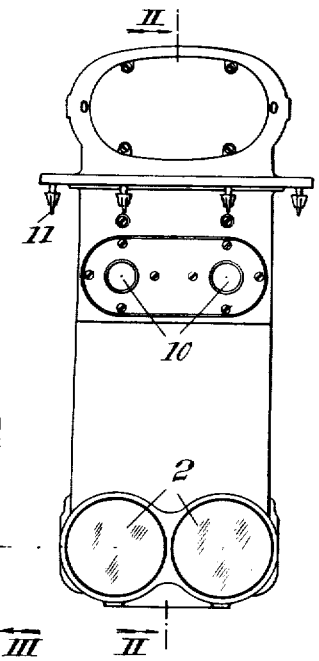

Figs. 2 and 3 show an embodiment of my invention. In these figures, the same parts are designated by the same reference numerals as in Fig. 1.

The optical axis of this telescope (or, to be more accurate, each of the two parallel optical axes) is bent twice by means of two reflecting mirrors 7 and 8, one of which 7 is adjustable by means of screws 9. By acting upon these screws 9, it is possible to displace the image formed by the objective 1 in the field lens 3, for instance in order to center this image with respect to cross-wires carried by said lens and in order to superimpose the two images formed by the two elementary telescopes of the binocular instrument.

The following table gives data for the construction of such a telescope. In this table, R designates the radius of curvature of each face of the lenses in millimeters, the + sign being that of the incident light. $e$ designates the thicknesses of these lenses or the intervals between two consecutive lenses in millimeters. $n$ designates the refraction indexes of the glasses used to make these lenses, and $\nu$ designates the coefficients of dispersion as a function of the wavelength of the incident light.

It is pointed out that the objective and the eyepiece that are used are identical systems of four lenses through which the light rays pass in the same direction. Such an arrangement serves to reduce the cost of the apparatus.

10 and 10′ are pellets of a substance intended to absorb moisture and 11 designates the means for the fixation of the telescope.

Such a telescope gives an image of the object to be observed which is sharp in the whole range of the field and is corrected for all aberrations with a position of the observer's eyes at a distance of 24 cm. from the corresponding eye lens. However the image remains good as long as said eye is located at a distance ranging from 15 to 30 cm.

The above numerical values have been given merely by way of example and may of course be modified at will if necessary or advisable.

In particular it may be advantageous, in order to increase the field and the luminosity of the instrument, to make use of lenses made of glasses having a high refractory index (1.7 and more).

It is pointed out that the two elementary telescopes which form the binocular instrument according to my invention are disposed in parallel relation side by side and rigidly assembled together, the distance between the respective optical axes being for instance 64 mm., that is to say the average distance between the eyes of ordinary persons. In view of the very great dimensions of the exit pupils of these two elementary telescopes (these dimensions correponding to a diameter from 3 to 5 cm.), the apparatus is used without any adjustment of the distance between the two elementary telescopes since any observer can always place the pupils of his eyes in the respective exit pupils of the instrument.

| | | | | |
|---|---|---|---|---|
| Compound objective 1 (Diameter, 61 mm.). | $R_1 = +391.13$ | $e_2 = 4.39$ | $n_2 = 1.6501$ | $\nu_2 = 33.7$ |
| | $R_3 = +66.7$ | $e_4 = 12.08$ | $n_4 = 1.5801$ | $\nu_4 = 53.9$ |
| | $R_5 = -144.54$ | $e_6 = 4.39$ | $n_6 = 1$ | air |
| | $R_7 = +443.8$ | $e_8 = 4.39$ | $n_8 = 1.6501$ | $\nu_8 = 33.7$ |
| | $R_9 = +74.28$ | $e_{10} = 15.84$ | $n_{10} = 1.5801$ | $\nu_{10} = 53.9$ |
| | $R_{11} = -131.2$ | $e_{12} = 93.75$ | $n_{12} = 1$ | air |
| Field lens 3 (Diameter, 50 mm.). | $R_{13} = +102.81$ | $e_{14} = 9$ | $n_{14} = 1.516$ | $\nu_{14} = 60$ |
| | $R_{15} = -102.81$ | $e_{16} = 139.7$ | $n_{16} = 1$ | air |
| Erector 4 (Diameter, 39 mm.). | $R_{17} = +66.7$ | $e_{18} = 2.65$ | $n_{18} = 1.721$ | $\nu_{18} = 29$ |
| | $R_{19} = +29.27$ | $e_{20} = 10$ | $n_{20} = 1.571$ | $\nu_{20} = 55$ |
| | $R_{21} = -66.7$ | $e_{22} = 133.7$ | $n_{22} = 1$ | air |
| Diverging lens (Diameter, 80 mm.). | $R_{23} = -279.46$ | $e_{24} = 3$ | $n_{24} = 1.516$ | $\nu_{24} = 60$ |
| | $R_{25} = +279.46$ | $e_{26} = 92$ | $n_{26} = 1$ | air |
| Compound eyepiece 2 (Diameter, 61 mm.). | $R_{27} = +391.13$ | $e_{28} = 4.39$ | $n_{28} = 1.6501$ | $\nu_{28} = 33.7$ |
| | $R_{29} = +66.7$ | $e_{30} = 12.08$ | $n_{30} = 1.5801$ | $\nu_{30} = 53.9$ |
| | $R_{31} = -144.54$ | $e_{32} = 4.39$ | $n_{32} = 1$ | air |
| | $R_{33} = +443.8$ | $e_{34} = 4.39$ | $n_{34} = 1.6501$ | $\nu_{34} = 33.7$ |
| | $R_{35} = +74.28$ | $e_{36} = 15.84$ | $n_{36} = 1.5801$ | $\nu_{36} = 53.9$ |
| | $R_{37} = -131.2$ | | | |

Figure 4:
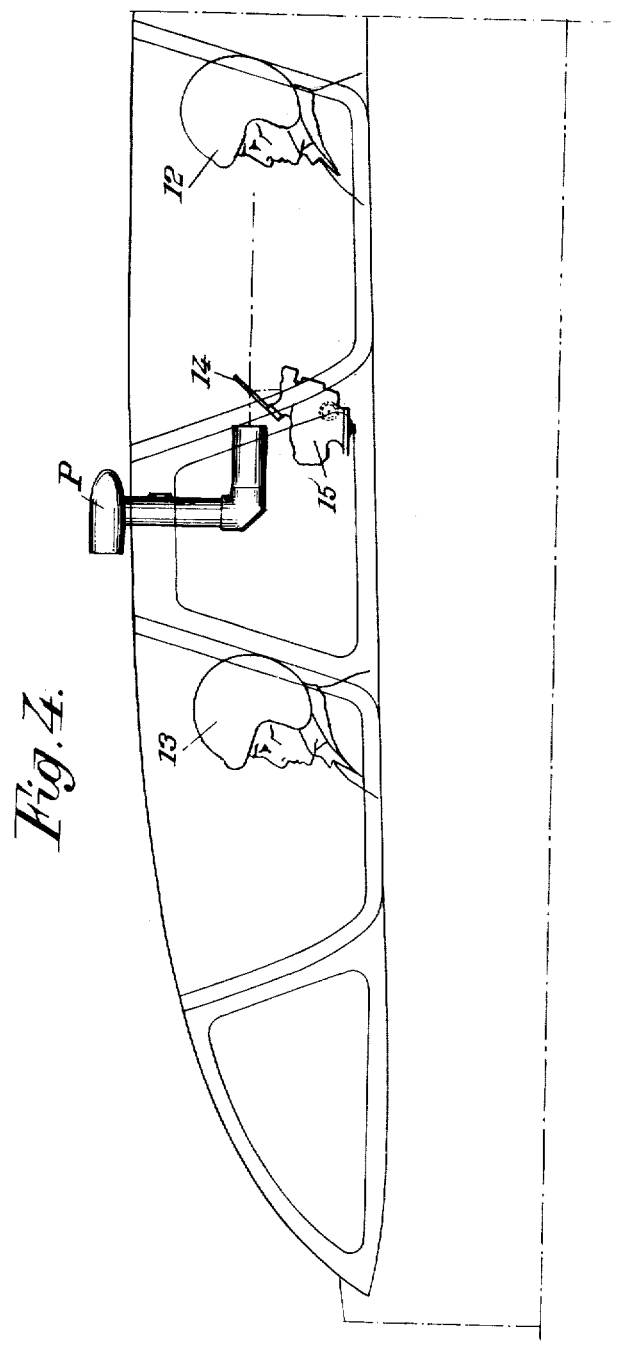
Fig. 4 shows the application of such a telescope.

A periscopic telescope P such as above described is advantageously used on an airplane as shown by Fig. 4.

When, as illustrated, an observer 12 is placed behind a pilot 13, the visibility afforded to him is very bad. On the other hand, the position of the head of observer 12 can be determined in a rather accurate manner and it is adjustable by determining the position of the seat on which he is placed.

The periscopic telescope P according to my invention is therefore disposed so that the axes of the eyepieces are in line with the eyes of observer 12 such as he is positioned in the airplane, whereas the objectives are located on the roof of the cabin.

Advantage may be taken of the interval existing between the telescope and the head of the observer to place in this interval a semi-reflecting glass 14 across the path of the light rays issued from the telescope, this glass reflecting toward the observer, together with these rays, the rays of light beams emitted from a sighting apparatus such as 15.

This sighting apparatus 15 includes a navigation or sighting instrument which is thus made visible to the observer in superimposed relation to the objects located on the outside of the airplane.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

A binocular telescope which comprises, in combination, two identical elementary telescopes disposed side by side and parallel to each other, each of said telescopes including the following refractive elements, to wit an objective, an eyepiece mounted to cooperate with said objective to produce an enlarged image, an erector system interposed between said objective and said eyepiece, and diverging lens means located between said objective and said eyepiece to position the exit pupil of the optical system at a substantial distance behind said eye lens, at least said objective having a diameter ranging from 4 to 6 centimeters and said refracting elements being disposed so that said exit pupil has a diameter ranging from 3 to 5 centimeters and is located at a distance behind said eyepiece ranging from 15 to 30 centimeters, the distance between said two elementary telescopes being fixed at a value equal to the average distance between the eyes of normal persons, whereby any observer can place the pupils of his eyes respectively in the exit pupils of the telescope without adjustment of said telescope.

References Cited in the file of this patent

UNITED STATES PATENTS

| | | |
|---|---|---|
| 1,851,579 | Hixon | Mar. 29, 1932 |
| 2,207,124 | Kollmorgen | July 9, 1940 |
| 2,537,962 | Brown | Jan. 16, 1951 |
| 2,658,422 | Miles | Nov. 10, 1953 |

FOREIGN PATENTS

| | | |
|---|---|---|
| 67,823 | Germany | Apr. 15, 1893 |